(12) United States Patent
Cherdron et al.

(10) Patent No.: US 8,655,948 B2
(45) Date of Patent: Feb. 18, 2014

(54) USER PRODUCTIVITY ON DEMAND SERVICES

(71) Applicants: Markus Cherdron, Muehlhausen (DE); Filip Misovski, Viernheim (DE); Yariv Zur, Kfar Saba (IL)

(72) Inventors: Markus Cherdron, Muehlhausen (DE); Filip Misovski, Viernheim (DE); Yariv Zur, Kfar Saba (IL)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/690,058

(22) Filed: Nov. 30, 2012

(65) Prior Publication Data

US 2013/0091202 A1    Apr. 11, 2013

Related U.S. Application Data

(63) Continuation of application No. 12/643,725, filed on Dec. 21, 2009, now Pat. No. 8,346,895.

(51) Int. Cl.
*G06F 15/16* (2006.01)
*G06F 15/177* (2006.01)
*G06F 3/048* (2013.01)

(52) U.S. Cl.
USPC ........... 709/203; 709/217; 709/219; 709/220; 709/223; 709/225; 715/769; 715/762; 715/764; 715/765; 715/810

(58) Field of Classification Search
USPC .......................... 709/203, 220, 223, 225, 219
See application file for complete search history.

(56) References Cited

U.S. PATENT DOCUMENTS

| | | |
|---|---|---|
| 6,922,723 B1 * | 7/2005 | Sharp et al. ................... 709/221 |
| 6,952,620 B2 | 10/2005 | Cherdron et al. |
| 7,212,212 B2 | 5/2007 | Cherdron |
| 7,225,424 B2 | 5/2007 | Cherdron et al. |
| 7,409,692 B2 | 8/2008 | Ittel et al. |
| 7,499,845 B1 * | 3/2009 | Quincy et al. ..................... 703/7 |
| 7,543,268 B2 | 6/2009 | Cherdron et al. |
| 7,581,204 B2 | 8/2009 | Reeder et al. |
| 7,600,215 B2 | 10/2009 | Cherdron et al. |
| 8,117,555 B2 | 2/2012 | Samson et al. |
| 8,254,648 B2 * | 8/2012 | Kariathungal et al. ........ 382/128 |
| 8,346,895 B2 * | 1/2013 | Cherdron et al. ............. 709/219 |
| 8,381,264 B1 * | 2/2013 | Corddry et al. .................... 726/3 |
| 2003/0174122 A1 * | 9/2003 | Dinges et al. .................. 345/156 |
| 2004/0250125 A1 | 12/2004 | Janson et al. |
| 2005/0026129 A1 * | 2/2005 | Rogers .......................... 434/322 |
| 2006/0168512 A1 | 7/2006 | Wilson et al. |
| 2007/0100943 A1 | 5/2007 | Brunswig et al. |
| 2007/0135121 A1 | 6/2007 | Bae et al. |
| 2007/0150562 A1 | 6/2007 | Stull et al. |
| 2008/0010585 A1 * | 1/2008 | Schneider et al. ............ 715/201 |
| 2008/0098085 A1 | 4/2008 | Krane et al. |
| 2008/0141153 A1 | 6/2008 | Samson et al. |
| 2008/0166070 A1 * | 7/2008 | Kariathungal et al. ........ 382/305 |
| 2008/0229251 A1 * | 9/2008 | Davies et al. .................. 715/854 |
| 2008/0306972 A1 | 12/2008 | Wilkin et al. |
| 2010/0070971 A1 * | 3/2010 | Shlomai et al. ................... 718/1 |
| 2010/0241579 A1 | 9/2010 | Bassett et al. |
| 2011/0078600 A1 | 3/2011 | Guertler et al. |
| 2011/0125829 A1 | 5/2011 | Finley et al. |

* cited by examiner

*Primary Examiner* — Jude Jean Gilles
(74) *Attorney, Agent, or Firm* — Fish & Richardson P.C.

(57) ABSTRACT

The present disclosure involves systems, software, and computer implemented methods for providing user productivity on-demand services. One process includes operations for determining a hosted service for use with an application at a client based on user context data associated with the application. A request for the hosted service and a reference to stored data required for the hosted service is received. The hosted service is executed, and the results are transmitted to the client.

20 Claims, 3 Drawing Sheets

USER PRODUCTIVITY ON DEMAND SERVICES

CLAIM OF PRIORITY

This application claims priority under 35 USC §119(e) to U.S. patent application Ser. No. 12/643,725, filed on Dec. 21, 2009, the entire contents of which are hereby incorporated by reference.

TECHNICAL FIELD

The present disclosure relates to software, computer systems, and computer implemented methods for user productivity on-demand services.

BACKGROUND

In some computing models, resources such as software and storage space are accessed by clients locally at, for example, a client's desktop computer. The software can be stored and executed from the client's local memory, and further upgrades or features of the software are provided by installing new versions of the software directly on the client computer. Likewise, the client computer may utilize only a local hard disk drive for storage space. The increased use of high bandwidth networks and data connections, and high capacity data storage servers, has resulted in the implementation of other computing models such as cloud computing solutions. In cloud computing solutions, resources, services, enhanced functionality, or software can be provided to a client computer across a network. Cloud computing models can also be used to provide shared access and remote storage of data to users. In cloud computing solutions, computing resources are provided as hosted services across a network such as the Internet.

End users of software applications may frequently work in a corporate environment with an information technology (IT) department. Improvements in the end users' productivity may require involvement of existing IT maintenance and administration processes. For example, upgrades to the software applications may require installation of a complete software package provided by an existing IT department. The end user may be limited to software versions that have been installed by the IT department if the end user's employer has not upgraded to more up-to-date versions of the application. In particular, end users that work in heterogeneous environments may interact with other end users that use different versions of various applications. Certain end users may use web application user interface technology when interacting with other systems or older versions of a front-end enterprise portal. The ever growing and changing demands of businesses may dictate quick updates and release of new features or applications from software developers. In some instances, an older version of an application is used merely because the end users' employer may not have adopted the newest version. Accordingly, some end users of a particular application may be forced to interface with other end users of the particular application using different versions of the same application. Further, the end user's productivity may be limited by the lack of enhanced functionality and configuration options of the application. Users outside of the end user's IT environment may work with applications similar to the end user's application that have a particular configuration of the application based on the users' roles within the working environment. These configurations and preferences implemented by other users may be inaccessible to the user or may require a complete software upgrade due to the restrictions inherent in an existing corporate IT infrastructure.

SUMMARY

The present disclosure involves systems, software, and computer implemented methods for providing user productivity on-demand services. A computer program product is encoded on a tangible storage medium, where the product comprises computer readable instructions for causing one or more processors to perform operations. These operations can include operations for determining a hosted service for use with a client application based on user context data associated with the client application. A request is received for the hosted service, and a reference to stored data required for the hosted service. The hosted service is executed, and the results are transmitted to a client.

While generally described as computer implemented software embodied on tangible media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

This disclosure generally describes computer systems, software, and computer implemented methods for providing on-demand services to an end-user. On-demand services can be hosted services that are provided over a network such as the Internet in a cloud computing implementation. In some implementations, the hosted services are computing resources such as business applications, software, data, and storage space that are stored or located at servers within the cloud computing network but that are provided to an end-user directly over the Internet or accessed by the end-user from a web browser. Thus, an existing business application can be complemented with additional features or even replaced with an entirely new business application through the cloud computing network without the installation of new software on a client computer or the involvement of an information technology (IT) department. In addition, data for improving user productivity can be shared among multiple end-users through the cloud computing network such as, for example, preferred business application configuration data or other information associated with best practices. To meet the ever growing and changing demands of businesses, a user of a business application can be provided with a flexible, integrated, and "self-service" work environment.

In certain implementations, an end-user of a business application requests an on-demand service available from a cloud computing network. User context metadata associated with the business application is identified and transmitted to the cloud computing network. Updated metadata associated with the on-demand service comprising additional features of the business application is received from the cloud computing network. The updated metadata is then applied to a user interface associated with the business application, allowing the end-user to utilize the requested on-demand service without acquiring additional software for installation on the end-user's computer. In other implementations, an end-user of a business application stores configuration settings of the business application. The configuration settings and situational data associated with the end-user is transmitted as user context data to a server in the cloud computing network. Based on the user context data, recommendations for improving productivity such as suggested configuration settings are generated and transmitted to the end-user.

One potential benefit of such techniques is that end-users are given the freedom and ability to access, use, or share newer services, features, or functionality of an existing application without the need to install a newer version of the application. For example, a particular business application product may be installed across a broad range of client computers associated with various end-users. The end-users may use the business application in connection with a business organization and within a particular IT environment maintained by the business organization. After a certain period of time, the software developers of the business application may have released additional features or an entirely new version of the business application to improve the productivity of users of the business application. Using the techniques of the present disclosure, the end-users of the business application can then access the newly released features of the business application by requesting the features as part of on-demand hosted services through a cloud computing network. Thus, the end-users can use new features of the business application according to each end-user's specific need or role within a business organization and without the need for approval or installation from the business organization's IT department. In other words, the end-user can manage the productivity of the client application because the end-user is aware of his own requirements and has access to resources on the Internet. The end-users of an existing application can choose to increase their own productivity without intrusion in existing IT maintenance and administration processes.

In addition, other benefits can be realized from the techniques of the present disclosure. For example, new on-demand services can be delivered to an end-user without requiring the end-user to upgrade existing technology. These new on-demand services can be hosted services that have been identified in a cloud computing network as having particular relevance for an end-user based on the end-user's particular role within an organization. Further, a new version of a business application or an entirely new application can be distributed to users in smaller components that can be consumed in an on-demand fashion. Similarly, user productivity enhancements can be delivered to end-users independently of application release cycles. Thus, the end-user can enhance productivity even if the end-user's employer is not upgrading to an updated version of the application. Finally, an end-user can access and apply business application configuration settings that have been used by other end-users having similar roles within their respective organizations. This allows end-users to optimize interactions with frequently used applications and tools, and as a result, increase user productivity. Also, the distribution of application configuration settings allows the end-users to network and collaborate with other end-users dealing with similar productivity issues.

From a business customer's perspective, new upgrades and services released by software developers can be distributed to employees on a case-by-case basis or provided in a narrowly tailored manner according to the business customer's requirements. The benefit to the business customer is that the business customer can scale its technology on a more flexible basis without requiring wholesale turnover of the business customer's existing applications or business infrastructure. Further, some business customers may not have the resources, IT infrastructure, or technical capability to implement large-scale upgrades or installation of up-to-date business applications, and the distribution of on-demand services as described in the present disclosure may allow for small or mid-sized business customers to access the most current releases provided by software developers in an efficient manner. Moreover, on-demand services provided to the business customers allows the business customers to avoid lengthy rollout times of business software applications. Business customers can minimize or reduce expenses related to time-consuming deployment of servers, software, and IT personnel required at each location. New locations and user services can be rolled out more quickly using on-demand services while avoiding the unpredictable expenses associated with large scale business application upgrades or installations.

Additional benefits include an increase in productivity across the entire business network and across different security domains. In other words, providing hosted services beyond a particular security domain managed by a particular firewall is typically limited by the difficulties associated with protecting sensitive information and providing the security required for a business environment. The on-demand services of the present disclosure, however, can be accessed and provided across corporate boundaries securely. Further, the users and the business community can provide data concerning particular needs and solutions for increasing user productivity through on-demand services. The developers of the on-demand services can respond accordingly based on contributions from the community, and the development of the business applications progresses at a speed based on the needs of the business customers.

Figure 1:
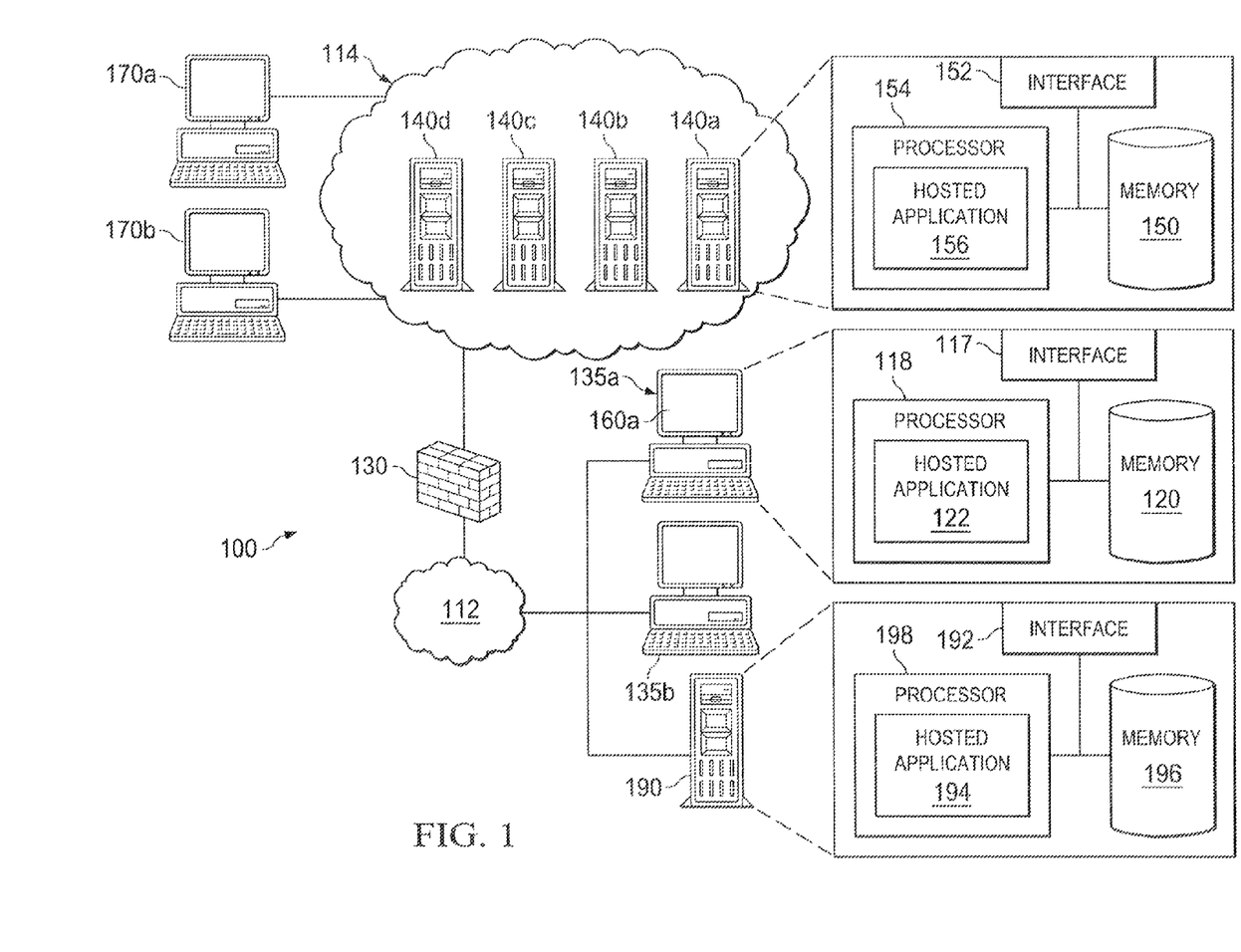
FIG. 1 illustrates an example environment implementing various features of providing a hosted service within the context of the present disclosure.

Turning to the illustrated example, FIG. 1 illustrates an example environment 100 for providing on-demand services to an end-user. The illustrated environment 100 includes or is communicably coupled with one or more servers 140 and one or more clients 135, at least some of which communicate across network 112. In some implementations, the one or more servers 140 provide a set of services to the client 135, and they can be logically grouped and accessible within a cloud computing network 114. In general, environment 100 depicts an example configuration of a system capable of providing on-demand services to clients without installation of new software or intervention from an IT department. The environment 100 also supports a system capable of enabling users to share and distribute configuration settings of an application.

The illustrated environment of FIG. 1 includes one or more clients 135. Each client 135 may be any computing device operable to connect to or communicate with other computing devices via the network 112 or with at least the servers 140 or 190 using a wireline or wireless connection. Further, as illustrated by client 135a, each client 135 includes a processor 118, an interface 117, a graphical user interface (GUI) 160a, a client application 122, and a memory 120. In some implementations, a server application 194 can be executed at a server 190 but accessed and displayed at client 135 in GUI 160a. The server application 194 is hosted in memory 196 at server 190, which can be physically located on the premises of client 135. In general, each client 135 comprises an electronic computer device operable to receive, transmit, process, and store any appropriate data associated with the environment 100 of FIG. 1. It will be understood that there may be any number of clients 135 associated with, or external to, environment 100. For example, while illustrated environment 100 includes two clients (135a and 135b), alternative implementations of environment 100 may include a single client 135 communicably coupled to the servers 140, or any other number suitable to the purposes of the environment 100. Additionally, there may also be one or more additional clients 135 external to the illustrated portion of environment 100 that are capable of interacting with the environment 100 via the network 112. Further, the terms "client," "user," and "end-user" may be used interchangeably as appropriate without departing from the scope of this disclosure. Moreover, while each client 135 is described in terms of being used by a single user, this disclosure contemplates that many users may use one computer, or that one user may use multiple computers.

As used in this disclosure, client 135 is intended to encompass a personal computer, touch screen terminal, workstation, network computer, kiosk, wireless data port, smart phone, personal data assistant (PDA), one or more processors within these or other devices, or any other suitable processing device. For example, each client 135 may comprise a computer that includes an input device, such as a keypad, touch screen, mouse, or other device that can accept user information, and an output device that conveys information associated with the operation of servers 140 and 190 or the client 135 itself, including digital data, visual information, the client application 122, server application 194, or the GUI 160a. Both the input and output device may include fixed or removable storage media such as a magnetic storage media, CD-ROM, or other suitable media to both receive input from and provide output to users of the clients 135 through the display, namely, the GUI 160a.

Generally, example client 135 may be communicably coupled with a network 112 that facilitates wireless or wireline communications between the components of the environment 100 (i.e., between each client 135 as well as between client 135 and servers 140 and 190), as well as with any other local or remote computer, such as additional clients, servers, or other devices communicably coupled to network 112 but not illustrated in FIG. 1. In the illustrated environment, network 112 is illustrated as a single network in FIG. 1, but may be a continuous or discontinuous network without departing from the scope of this disclosure, so long as at least a portion of the network 112 may facilitate communications between senders and recipients. The network 112 may be all or a portion of an enterprise or secured network, while in another instance at least a portion of the network 112 may represent a connection to the Internet. In some instances, a portion of the network 112 may be a virtual private network (VPN), such as, for example, the connection between the clients 135a and 135b and one or more servers 140 and 190. Further, all or a portion of the network 112 can comprise either a wireline or wireless link. Example wireless links may include 802.11a/b/g/n, 802.20, WiMax, and/or any other appropriate wireless link. In other words, the network 112 encompasses any internal or external network, networks, sub-network, or combination thereof operable to facilitate communications between various computing components inside and outside the illustrated environment 100. The network 112 may communicate, for example, Internet Protocol (IP) packets, Frame Relay frames, Asynchronous Transfer Mode (ATM) cells, voice, video, data, and other suitable information between network addresses. The network 112 may also include one or more local area networks (LANs), radio access networks (RANs), metropolitan area networks (MANs), wide area networks (WANs), all or a portion of the Internet, and/or any other communication system or systems at one or more locations.

In the illustrated environment, each of the clients 135 may belong to a network 112 that is maintained by an organization such as a company. The organization may incorporate clients 135 into a security domain to reduce security risks to the organization's data accessible via network 112. Accordingly, communication between clients 135 and server 190 within the organization's network 112 and computing devices external to the organization, such as servers 140 within cloud computing network 114 for example, may be governed by a firewall 130. Firewall 130 may comprise any device or set of devices configured to monitor and control data communications between different security domains (i.e., between devices connected via network 112 and servers 140 within the cloud computing network 114). Firewall 130 can be implemented in either hardware or software or both. The organization may have an information technology (IT) department that manages firewall 130 as well as the installation of applications on each client 135 and server 190.

Client 135 may have access to resources external to the firewall 130 including computing devices 170, other networks such as the Internet, and servers 140 within cloud computing network 114. The servers 140 within the cloud computing network 114 comprise a cloud computing platform for providing cloud-based services. The terms "cloud," "cloud computing," and "cloud-based" may be used interchangeably as appropriate without departing from the scope of this disclosure. Cloud-based services can be hosted services that are provided by servers and delivered across a network to a client platform to enhance, supplement, or replace applications executed locally on a client computer. Clients 135 can use cloud-based services to quickly receive software upgrades, applications, and other resources that would otherwise require a lengthy period of time before the resources can be delivered to the client 135.

As described in the present disclosure, on-demand services can include multiple types of services such as products, actionable analytics, enterprise portals, managed web content, composite applications, or capabilities for creating, integrating, and presenting business applications. For example, the cloud-based implementation of the present disclosure can allow clients 135 to transparently upgrade from an older user interface platform to newer releases of the platform without loss of functionality. Users of a server application 194 can also obtain suggested configuration settings for use with server application 194 based on user context data associated with the user. Based on the user's own self configuration settings and on user context data comprising situational data associated with the user, recommendations for increasing productivity for the user can be provided to the user.

Further, users can register in a cloud-based environment which allows the users to download additional features and capabilities to enhance the user's productivity on demand rather than relying on on-premise applications provided by a user's employer, for example, to increase user productivity features. The users can also store the user context data on a cloud-based server, which allows sharing knowledge with other users and increasing the speed at which new user productivity features are provided. Still further, additional features and services designed to augment an existing transaction or application can be provided graphically such as in the form of a side panel. The side panel can interact with existing applications and transactions and visually represent additional on-demand services that the user can select as needed. The side panel can also act as a document management service allowing users to add and store, via the side panel, attachments relevant to the user's current working context. Help services can also be enhanced via the side panel. For example, in addition to basic help content provided by an on-demand application, users can also integrate existing help content from a hosted environment or any other help providing environments. Furthermore, such help information can be shared among other users via on-demand services.

Additional on-demand services can also be implemented using the techniques described in the present disclosure. A tagging infrastructure and application interrogation APIs (application programming interface) can be used to augment and enhance existing applications. Applications can be interrogated to identify data objects for annotation via tags. The cloud-computing environment can then attach on-demand services to particular annotated and tagged objects such as search, mail, and financial data services. Thus, different applications and services can be coupled and augmented without changing the source code to the underlying applications. Moreover, on-demand services for automating tasks can record user interaction sequences and play the sequences back as needed so that users do not have to repeat repetitive tasks. Personal workflows can be optimized and elements of an application can work more effectively together using on-demand services for automating tasks. In addition, collaboration and decision making tools can be integrated into the existing customer landscape using on-demand services. Also, users can be enabled to create portal pages containing static content in conjunction with applications. Still further, existing applications can be simplified using on-demand services so that only the elements and information needed for the current task performed by the application are shown to a user.

In general, server 140a is any server that stores one or more hosted applications 156, where at least a portion of the hosted applications 156 are executed via requests and responses sent to users or clients within and communicably coupled to the illustrated environment 100 of FIG. 1. For example, server 140a may be a Java 2 Platform, Enterprise Edition (J2EE)-compliant application server that includes Java technologies such as Enterprise JavaBeans (EJB), J2EE Connector Architecture (JCA), Java Messaging Service (JMS), Java Naming and Directory Interface (JNDI), and Java Database Connectivity (JDBC). In some instances, the server 140a may store a plurality of various hosted applications 156, while in other instances, the server 140a may be a dedicated server meant to store and execute only a single hosted application 156. In some instances, the server 140a may comprise a web server, where the hosted applications 156 represent one or more web-based applications accessed and executed via network 112 by the clients 135 of the system to perform the programmed tasks or operations of the hosted application 156.

At a high level, the server 140a comprises an electronic computing device operable to receive, transmit, process, store, or manage data and information associated with the environment 100. The server 140a illustrated in FIG. 1 can be responsible for receiving application requests from one or more server applications 194 associated with the clients 135 of environment 100 and responding to the received requests by processing said requests in the associated hosted application 156, and sending the appropriate response from the hosted application 156 back to the requesting server application 194. Alternatively, the hosted application 156 at server 140a can be capable of processing and responding to local requests from a user accessing server 140a locally. Accordingly, in addition to requests from the external clients 135 illustrated in FIG. 1, requests associated with the hosted applications 156 may also be sent from internal users, external or third-party customers, other automated applications, as well as any other appropriate entities, individuals, systems, or computers.

As used in the present disclosure, the term "computer" is intended to encompass any suitable processing device. For example, although FIG. 1 illustrates a group of servers 140, environment 100 can be implemented using computers other than servers, including a server pool. Indeed, server 140 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 140 may be adapted to execute any operating system, including Linux, UNIX, Windows, Mac OS, or any other suitable operating system. According to one embodiment, server 140 may also include or be communicably coupled with a mail server.

In the present implementation, and as shown in FIG. 1, the server 140a includes a processor 154, an interface 152, a memory 150, and one or more hosted applications 156. The interface 152 is used by the server 140a for communicating with other systems in a client-server or other distributed environment (including within environment 100) connected to the network 112 (e.g., client 135, as well as other systems communicably coupled to the network 112). Generally, the interface 152 comprises logic encoded in software and/or hardware in a suitable combination and operable to communicate with the network 112. More specifically, the interface 152 may comprise software supporting one or more communication protocols associated with communications such that the network 112 or interface's hardware is operable to communicate physical signals within and outside of the illustrated environment 100.

As illustrated in FIG. 1, server 140a includes a processor 154. Although illustrated as a single processor 154 in FIG. 1, two or more processors may be used according to particular needs, desires, or particular embodiments of environment 100. Each processor 154 may be a central processing unit (CPU), a blade, an application specific integrated circuit (ASIC), a field-programmable gate array (FPGA), or another suitable component. Generally, the processor 154 executes instructions and manipulates data to perform the operations of server 140 and, specifically, the one or more plurality of hosted applications 156. Specifically, the server's processor 154 executes the functionality required to receive and respond to requests from the clients 135 and their respective client applications 122 or server applications 194, as well as the functionality required to perform the other operations of the hosted application 156.

Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, ABAP (Advanced Business Application Programming), Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate. In the illustrated environment 100, processor 154 executes one or more hosted applications 156 on the server 140a.

At a high level, each of the one or more hosted applications 156 is any application, program, module, process, or other software that may execute, change, delete, generate, or otherwise manage information according to the present disclosure, particularly in response to and in connection with one or more requests received from the illustrated clients 135 and their associated client applications 122 or server applications 194. In certain cases, only one hosted application 156 may be located at a particular server 140. In others, a plurality of related and/or unrelated hosted applications 156 may be stored at a single server 140, or located across a plurality of other servers 140, as well. In certain cases, environment 100 may implement a composite hosted application 156. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, the hosted applications 156 may represent web-based applications accessed and executed by remote clients 135 or server applications 194 via the network 112 (e.g., through the Internet). Further, while illustrated as internal to server 140, one or more processes associated with a particular hosted application 156 may be stored, referenced, or executed remotely. For example, a portion of a particular hosted application 156 may be a web service associated with the application that is remotely called, while another portion of the hosted application 156 may be an interface object or agent bundled for processing at a remote client 135. Moreover, any or all of the hosted applications 156 may be a child or sub-module of another software module or enterprise application (not illustrated) without departing from the scope of this disclosure. Still further, portions of the hosted application 156 may be executed by a user working directly at server 140, as well as remotely at client 135.

In general, the server 140a also includes memory 150 for storing data and program instructions. Memory 150 may include any memory or database module and may take the form of volatile or non-volatile memory including, without limitation, magnetic media, optical media, random access memory (RAM), read-only memory (ROM), removable media, or any other suitable local or remote memory component. Memory 150 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 140a and its one or more hosted applications 156. Still further, memory 150 may include any other appropriate data, such as VPN applications, firmware logs and policies, HTML files, data classes or object interfaces, unillustrated software applications or sub-systems, firewall policies, a security or access log, print or other reporting files, as well as others.

While FIG. 1 is described as containing or being associated with a plurality of elements, not all elements illustrated within environment 100 of FIG. 1 may be utilized in each alternative implementation of the present disclosure. For example, although FIG. 1 depicts a server-client environment implementing a hosted application 156 at server 140 that can be accessed by client computer 135, in some implementations, server 140 can execute a local application that features an application user interface accessible to a user directly utilizing GUI 160b to inject software components representing on-demand services to the application user interface. Additionally, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
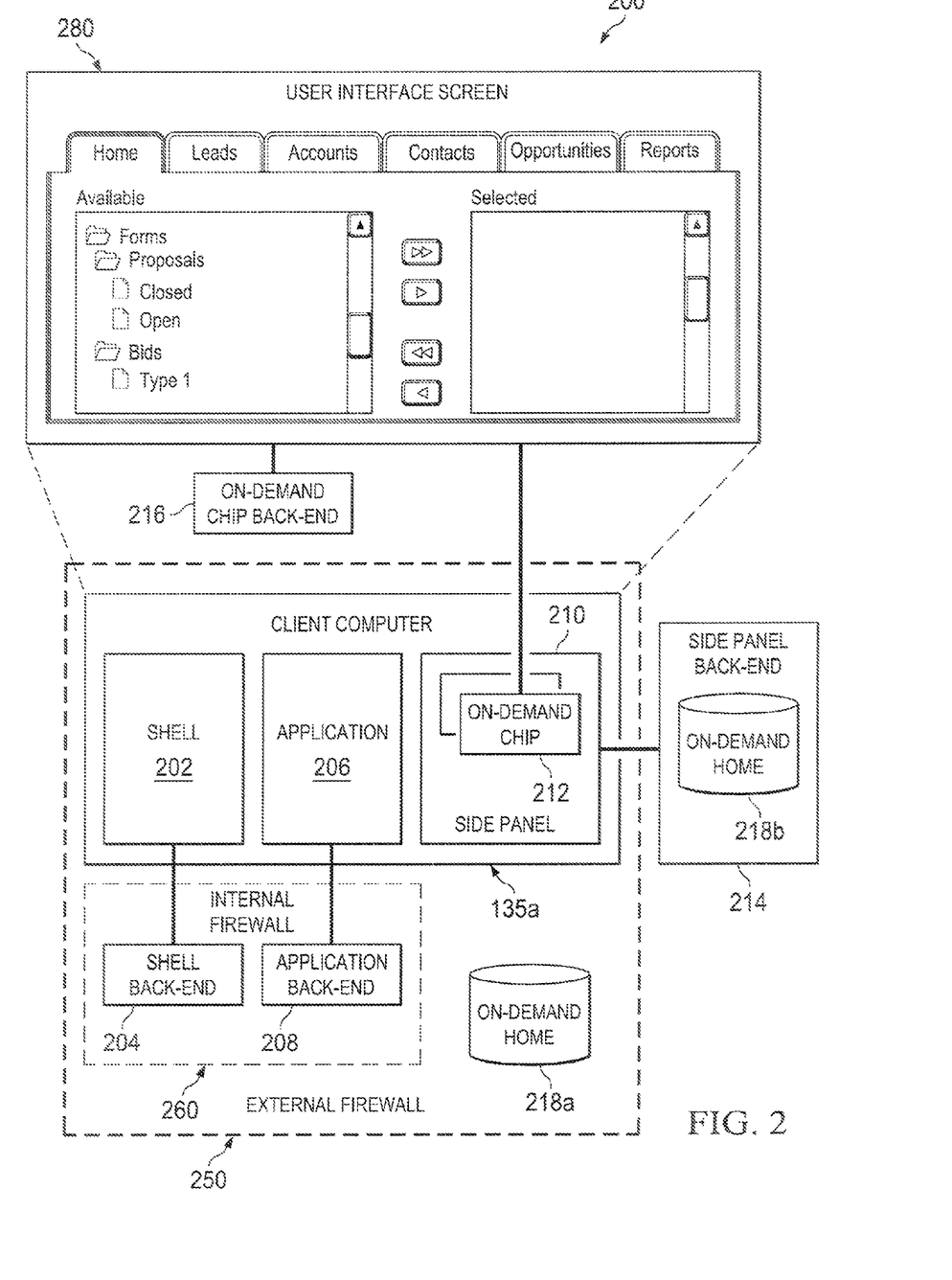
FIG. 2 illustrates an example environment for providing on-demand services to a client computer within the context of the present disclosure.

The providing of multiple on-demand services to a client described in the present disclosure can include different implementations. FIG. 2 illustrates one example environment for providing on-demand services to a client computer 135a. A networking environment 200 can include an external firewall 250 and an internal firewall 260. The internal firewall 260 manages and controls data communications within a business entity or business customer. For example, client computer 135a can be used by a user within the business customer's domain and may execute a hosted "on-premise" application 206 by traversing the internal firewall 260 and accessing the back-end server 208 that hosts the application 206. Similarly, application 206 can be used in connection with a shell application programming interface (API) 202 that provides an interface between application 206 and other applications, operating systems, or interfaces on the client computer 135a. The shell API 202 can also be hosted on a shell back-end server 204 accessible through internal firewall 260. In certain implementations, shell API 202 provides a persistent and up-to-date environment for application 206. Users of client computer 135a can always be presented with an updated desktop working environment, web browser, and other applications through shell API 202. Thus, new applications or services can be automatically and seamlessly provided to application 206 through shell API 202 when they are released and without user intervention.

The networking environment 200 can also include an external firewall 250 that manages and controls data communications between computers located within the business customer's security domain, i.e., within the external firewall 250, and computers external to the business customer domain. In some implementations, an internal computer such as client computer 135a can execute applications hosted on remote servers external to firewall 250, such as servers in a cloud network 114 as depicted in FIG. 1. For example, shell API 202 may implement a side panel application 210 in connection with application 206, and the side panel application 210 may further provide one or more on-demand services. The side panel application 210 allows generic interaction with existing applications and transactions at client computer 135a. In certain implementations, the side panel application 210 can also visually represent additional on-demand services that the user can select for incorporation into application 206. The side panel application 210 can be represented visually in the application's user interface 280 as an "on-demand home page." The side panel application 210 can be hosted at a side panel back-end server 214, which is accessed by the client computer 135a through the external firewall 250. The side panel back-end server 214 may be one of many servers in a network such as cloud network 114. The data for the on-demand home page can be stored locally in memory 218a or remotely at the side panel back-end server in memory 218b. Further, the on-demand services and updated enhancements provided from servers in a cloud network 114, such as services hosted on the side panel back-end server 214, are available to the user faster than if the applications or services were installed directly on client computer 135a or on servers within the external firewall 250 such as on the application back-end server 208.

In some implementations, the on-demand services are provided to empower users to create and adapt their own application workspaces based on their understanding of the business. Specifically, the on-demand services provided by the side panel application 210 can be included in or represented as software components called mashup components or on-demand chips 212. While the chips 212 are described as "on-demand" chips, the present disclosure contemplates the use of "on-premise" services and chips in addition to, in place of, or in combination with on-demand chips 212 for generating a user's application workspace. An on-demand chip 212 is an application or a module, subroutine, process, service, or other component of an application that can be combined with other similar components into a new service or arranged in a particular layout along with other components to present a customized arrangement of applications for convenient access to a user. The on-demand chips 212 can be characterized as small, reusable pieces of the content of a business application. Users can build the on-demand chips 212 from existing content elements of business applications such as screens, portal views, or dashboards. The on-demand chips 212 can be visually represented as a user interface element that is easily moved from one location to another within the GUI 160a of client computer 135a. The chips 212 can be hosted remotely at a server outside the external firewall 250 ("on-demand chip"), such as on the on-demand chip back-end server 216, or locally on the premises of client computer 135a at a server within the external firewall 250 ("on-premise chip").

Further, the on-demand chips 212 can also be "mashable" in the sense that they can be linked with other components or with an underlying application for data flow. That is, input and output ports from one on-demand chip can be connected to input and output ports of another on-demand chip or application. Thus, a user of client computer 135a can incorporate a variety of on-demand services into application 206, each on-demand service represented by a mashable on-demand chip 212 and hosted at an on-demand chip back-end server 216. The on-demand chip back-end server 216 can be located within a network such as cloud network 114. Moreover, on-demand chip back-end server 216 can be one of many servers within a cloud network 114, each server providing one or more on-demand services such as on-demand chips 212 or other services. One or more containers with page-building services can be used in connection with the on-demand chips 212 to aggregate and enable the chips 212 from various user interface technologies and systems. Accordingly, application 206 can be enhanced with a selection of on-demand services that a user of client computer 135a can choose from in the form of on-demand chips 212 presented in a side panel application 210 and shell 202. These enhancements can be provided to the user to complement the functionality of an existing application 206 without upgrading the application 206 or installing the enhancements directly on client computer 135a or the application back-end server 208. The user can then create personalized application workspaces adapted to the user's needs and business situations without the need for central IT involvement.

In some instances, the existing personalization infrastructure of the application 206 is utilized to inject or combine an on-demand chip 212 into the user interface of the application 206. The personalization infrastructure includes persistent personalization settings that store personalization data for the hosted application 206. Just as personalization data would typically be stored in the persistent personalization settings during normal execution of the application 206, the data associated with the insertion of the on-demand chips 212 in the application user interface 280 is also stored in the persistent personalization settings. The persistent personalization settings allow personalization data to be stored for an application and for changes to the personalization data to remain in effect even after termination of the application. The personalization settings can also be used to generate controls for the on-demand chip 212 such as a text field or a user interface link element. Thus, even when application 206 requires use of the full screen of GUI 160a during runtime, the user interface of the application 206 may still be used as a backdrop for including on-demand chips 212 incorporated into the application user interface and applied to the application 206 based on a user's selection from side panel 210.

The on-demand chips 212 can be merged into the application's user interface 280 by creating a user interface container. The user interface container can be created after input is received from a user indicating the element or location in the application's user interface 280 that is to be used for receiving the on-demand chip 212. The parameters of the user interface container are added to the user interface control tree of the application 206, and the location of the user interface container within the control tree and the on-demand chip 212 are stored in the persistent personalization settings of the application 206. Finally, the on-demand chip 212 is executed within the user interface container as an embedded application or embedded component within the application's user interface 280. The injection of the on-demand chip 212 into the application user interface 280 results in the integration of a user interface framework standard component with the underlying hosted application 206. In other words, the on-demand services 212 can be injected into the user interface of the application 280 using the personalization settings of the application 206, without requiring a user to have knowledge of particular technical skills. Further, in some implementations, the injected on-demand chip 212 can be linked to services, modules, subroutines, or other components within application 206 by connecting input or output ports between the on-demand chip 212 and any components within application 206.

In some implementations, shell API 202 provides a desktop component for application 206 that is configured to access metadata associated with the user's role within an organization such as a business. Based on the user's metadata, certain on-demand chips 212 can be dynamically injected into the user interface of application 206. The on-demand chips 212 presented to the user in application 206 may change based on the changing role of the user within the business. In other words, the on-demand chips 212 available for selection by the user in the side panel application 210 may change in accordance with changes to the role metadata associated with the user. Moreover, the on-demand environment can enable integration of third party services such as document management vendors as well as innovative decision making solutions. The on-demand chips 212 can also be combined with on-premise chips, or software components accessed locally or through an internal network, to create a user-specified application workspace. Further, application 206 can be configured to not only be updated with on-demand chips 212 in response to changes to a user's role metadata but also in response to external status changes such as changes in the business's status or the status of third party business entities related to the user. A persistent business context is applied to a user's application workspace that ensures the application workspace reflects changes to business entities and applicable business processes that are of interest to the user or that are associated with the user's role within the business. Accordingly, the application workspace can be updated based on identification of new third party services or changes to existing third party services.

On-demand chips 212 can also be incorporated into a user's application workspace by applying tagging data to data objects used by an application. Existing applications can be augmented and enhanced through a tagging infrastructure that associates data objects in an application with on-demand services. Tags can be applied to a data object that are merely descriptive of the data object, or the tags can be additional data linking the data object to a software component such as, for example, an on-demand chip 212. The tagging data applied to data objects helps facilitate user-intuitive extension of the functionality of current applications that do not necessarily have tagging capabilities. In some implementations, data objects can be graphical elements in the user interface of the application. Specifically, an application 206 can be interrogated and particular data objects associated with the application 206 can be annotated via tags. The existing personalization infrastructure of the application 206 can be used to apply tagging data to data objects used by application 206. The tagging data is not stored for a user interface element or a field of the user interface element but for bound data objects underlying the user interface element. The tagging data is stored in the same way as any other kind of personalization data for the application 206. On-demand chips 212 can then be executed using the tagged data objects as input values when the tagged data objects are selected. Thus, various user interface elements of application 206 can be linked with on-demand chips 212 to enhance the functionality of application 206 in a user-friendly way.

The on-demand services provided through the shell API 202 and available to a user of application 206 can also include the ability to streamline or adapt existing applications according to the requirements of the task at hand or the current working context. For example, existing business applications can be complex and may include various features for fulfilling any task related to creating or modifying data objects. A user of a business application may only want or need the application to show the features needed for a particular task. For example, if the user is creating sales orders for only one customer, the user should not be required to reenter the customer and address information each time a sales order is created. The shell API 202 and on-demand services can be configured to hide redundant or unnecessary functions within the business application such as the customer and address information, or simply to display the same customer name and address information for each sales order. In other words, the on-demand services described in the present disclosure can reduce existing applications to a bare minimum according to the need of the business process or task. The streamlined application can then be augmented with additional information to assist the user of the application based on the current task. For example, to assist a user in creating a sales order, the products that were ordered previously may be displayed as a quick reference, or information from external sites such as the least expensive delivery service for the destination country can be provided to the user. Thus, application 206 and its features can be adapted to a user's particular needs.

Further, enhancing existing applications such as application 206 with on-demand services can include updating the existing user interface of application 206. The existing application user interface can be turned into a "smart application" user interface with context-sensitive navigation, disclosures of data related to elements in the application user interface, related contributions from other users over a network, flexible rendering of graphical elements and customization of application views, in-line editing of tables with shared notes and comments, and other enhancements to a user interface of application 206. The updating of application user interfaces can utilize user-driven semantics and presentation layer rendering to resolve differences in the underlying semantics of the original user interface and the updated user interface. First, user interface metadata associated with an original application user interface is extracted from the user's client computer 135a or from a data dictionary at a back-end server 208 hosting application 206. The semantics of particular user interface fields of the original application user interface can be tagged or declared by users and associated with particular functionality. The user interface metadata can then be indexed and made available or transmitted across a network for access by other users and applications. Based on the user-defined semantics of the user interface metadata, each field or element of the user interface metadata can be associated with elements of other systems. The metadata of the original application user interface can then be associated with updated enhancements and user interface features available on a cloud network or other network. The updates to the user interface can be applied to the user interface of application 206.

From a user's perspective, a user may use a current application 206 at client computer 135a. The application 206 may be operated in connection with a shell API 202 that provides the user interface framework for the application 206 and for the availability of additional on-demand services that can be used in conjunction with application 206. Both application 206 and the shell API 202 may be hosted at on-premise back-end servers 208 and 204 within an internal firewall 260. The on-demand services available to the user through shell API 202 can include hosted services represented as on-demand chips 212, which the user can select in the user interface screen 280 presented to the user at client computer 135a. The on-demand chips 212 may be provided and organized within a side panel application 210 for the user to view and select from. The user may select a particular on-demand chip 212 for incorporation into application 206. The server hosting the on-demand chip, on-demand chip back-end server 216, receives the user's request for the on-demand service represented in the on-demand chip 212. The on-demand service can then be executed at the on-demand chip back-end server 216, and the results of the execution of the on-demand service can be returned to the client computer 135a for inclusion into application 206. In some implementations, execution of the hosted service may require access to data stored at client computer 135a or at an on-premise server within external firewall 250. A reference to the data, rather than the actual data, may be passed to on-demand chip back-end server 216 for execution of the hosted service. The results of the hosted service are then transmitted to the client computer 135a based on the reference to the required data.

The on-demand services available to a user of application 206 can also include the application of configuration settings associated with other users and shared across a network or situational data based on a user's role within a company. For example, application 206 can be automatically configured with particular settings designed to increase user productivity based on the user's job title, division, or responsibilities within a company. The configuration settings may be requested from servers or shared with other users through a cloud network 114. Further, information or settings associated with best practices within an industry or within the user's company can be provided as on-demand services. Each on-demand service can be accessible to a user of application 206 or shared with other users through a network such as cloud network 114.

The shell API 202 and on-demand chips 212 depicted in FIG. 2 are example implementations for providing on-demand services across a network as described in the present disclosure to enhance an application 206 at a client computer 135a. Another example of on-demand services includes business worklists that can be provided to a user as an on-demand service or on-demand chip 212 from an on-demand chip back-end server 216. The business worklists include metadata for configuring and accessing particular application objects and functions, allowing efficient access to the application objects and functions without complex navigation through standard transactions involving the application's user interface. Business worklists can be generated automatically based on metadata concerning a user's role within an organization. Alternatively, business worklists can be manually created by users based on the user's own preferences or based on recognized best practices that can be shared across a network with other users. Users that share similarities in roles within their respective organizations, for example, may share their business worklists, or access to automatically generated worklists may be given to other users. The business worklists can be applied to application 206 to automatically configure application 206 or incorporate on-demand services into application 206 according to user preferences, best practices, or role metadata as defined in the business worklists. Further, the business worklists can be provided to mobile devices so that the content and configuration data of application 206 can be easily accessible on mobile devices. A user first selects a business worklist to be made available on a mobile device, and the on-demand chip 212 can be configured to push the business worklist and associated data to a mobile gateway, where the business worklist can be transferred to the mobile device. Thus, business worklist functionality and self-service mobility can be instantly delivered to users of application 206 and business worklists.

Figure 3:
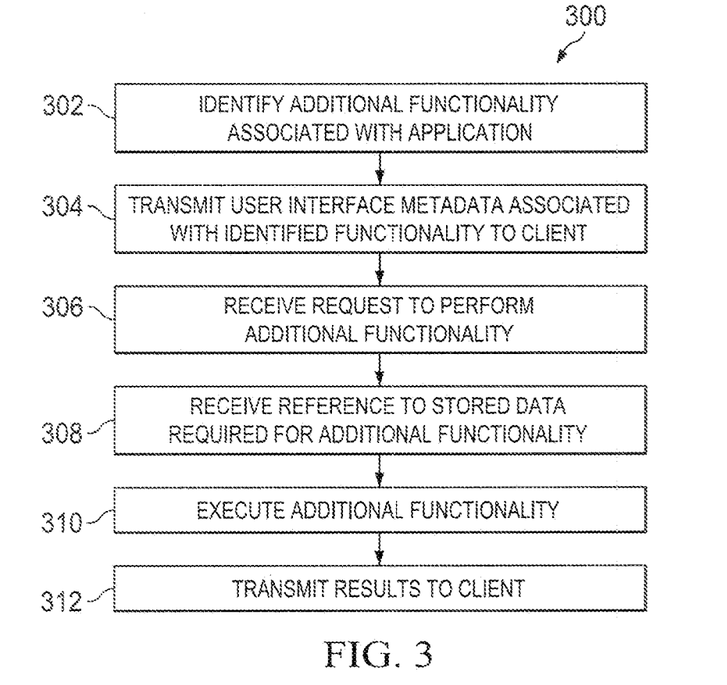
FIG. 3 is a flow chart of an example process of determining appropriate on-demand services for a particular client and delivering the services to the client using an appropriate system, such as the system described in FIG. 1.

FIG. 3 is a flow chart from a server's perspective illustrating the process of identifying appropriate on-demand services for a particular client 135 and delivering the services to the client 135. For clarity of presentation, the description of method 300 references environment 100 illustrated in FIG. 1, using example elements that may perform one or more of the described operations. However, it will be understood that method 300 may be performed, for example, by any other suitable system, environment, or combination of systems and environments as appropriate. First, additional functionality associated with a particular application such as server application 194 is identified at 302. The additional functionality can be a recently developed feature for the server application 194, a supplemental software module for the application 194, a hosted service or on-demand service associated with server application 194, or a new release or version of the application 194. The additional feature or functionality can also be configuration settings of the application 194 that are suggested to a user of the application 194 based on the user's role within an organization or based on the configuration settings of other users with similar roles within the organization. In other words, the additional functionality can be any solution, tool, service, or resource currently unavailable to the server application 194 locally that can be supplied over a network such as a cloud network from a hosted application 156 on a server 140. The particular functionality identified as appropriate for the user of the application 194 can be determined in a variety of ways. For example, user context metadata can be received at server 140a from the client computer 135a in connection with server application 194. In the present disclosure, "user context metadata" is used to describe some information collected, known, stored, determined, received, or otherwise identified by some component of system 100 to be associated with a user's role in an organization, business, the user's business, a business application or process, and/or business activity of the user, business, or process or data involved therein. The user context metadata can be used to associate additional functionality with the server application 194 that would be useful to the user in view of the user's role within the organization. Alternatively, the additional functionality can be identified when a request for a particular on-demand service as specified by a user of server application 194 is received at server 140.

After the appropriate additional functionality has been identified for a particular user at 302, the graphical representation of the functionality can applied to the client's user interface 160a after the user interface metadata associated with the identified functionality has been transmitted to the client 135 at 304. This user interface metadata can be initially obtained when it is extracted from the client system 135 or a data dictionary at the back-end servers 190 hosting the server application 194. In certain implementations, permission is requested from the user before the additional functionality is integrated into the server application 194. Alternatively, the graphical representation of each additional identified feature can be seamlessly and automatically included in the GUI of client 135 so that from the user's perspective, the server application 194 is a continually updated application with the most recently developed and requested features or solutions. The updating of the client's user interface 160a with the additional functionality can be implemented either before or after the additional functionality is executed by the user.

Next, at 306, a request to perform the identified additional functionality is received at server 140a. In some implementations, the additional functionality requires access to data stored locally at the client 135a or stored within a network 112 behind a firewall 130. Instead of transmitting the data across the cloud computing network 114 and potentially compromising sensitive data, a reference to the stored data can be passed from client 135 to server 140a for executing the requested functionality at 308. Thus, the functionality is executed by server 140a at 310, and the results are passed to the client 135a with a reference to the stored data so that the user of the application 194 can view the data without transmitting sensitive information outside of the firewall 130. Finally, after server 140a has executed the additional functionality based on the stored data, the results and any user interface metadata associated with the additional functionality are transmitted to the client 135 at 312.

Figure 4:
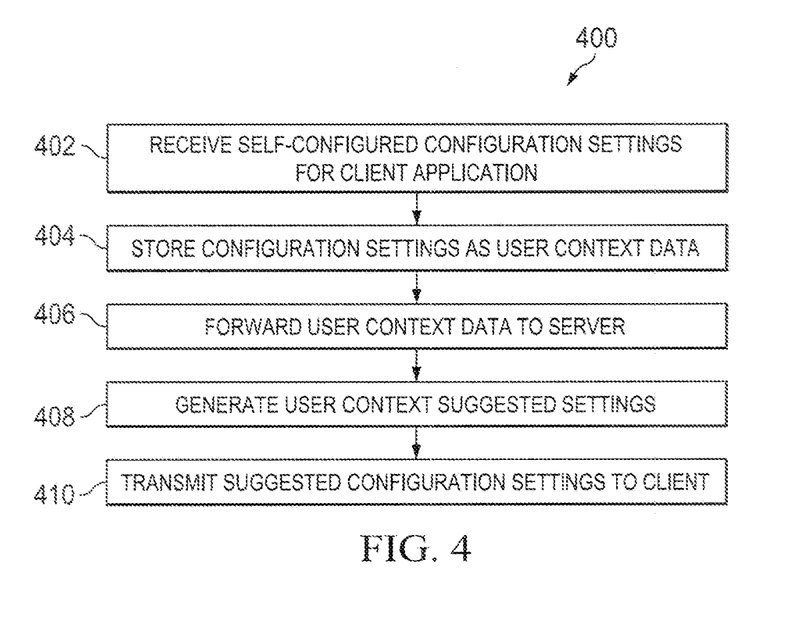
FIG. 4 is a flow chart of an example process of identifying configuration settings for a client application using an appropriate system, such as the system described in FIG. 1.

FIG. 4 is a flow chart illustrating the process of identifying configuration settings for server application 194. In the illustrated example, a user of server application 194 can be an employee of a company. The user can initially self-configure relevant settings of the application 194 at 402. For example, navigation tools, menus, and graphical elements can be initially arranged in a customized manner for the user's needs and preferences. The settings can then be stored as user context data either at client 135 or remotely on a server 140 at 404. Other data such as the user's job title, job responsibilities, location, group or division, experience, current projects, peers, and other relevant situational information can also be stored as user context data along with the user's configuration settings. The user context data is then transmitted to a server 140*a* in cloud computing network 114 for processing at 406. Based on the user context data—i.e., the configuration settings and relevant situational information associated with the user—the server 140*a* can generate and return to client 135*a* user context recommendations for improving productivity for this particular user at 408. The user context recommendations can also include suggested configuration settings for server application 194 based on prior configurations saved by the user. Alternatively, the suggested configuration settings can also be generated based on an internal process for identifying suitable settings for users based on relevant information such as each particular user's role within the company. In certain implementations, the suggested configuration settings are settings identified as a productive configuration setting by other users with similar situational data and connected to network 112 or another network. In other words, users that have similar roles within a company may benefit from shared configuration settings for server application 194 that have been identified by a user as being a particularly useful and productive setting. Finally, the suggested configuration settings are transmitted to client 135*a* at 410.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method implemented by data processing apparatus, the method comprising:
    receiving configuration settings for an application used by a user at a client;
    storing the configuration settings as user context data associated with the user; and
    automatically generating a user productivity recommendation for improving productivity of the user based on the user context data, wherein the user productivity recommendation includes suggested configuration settings suggested for the user based at least in part on prior configuration settings associated with the user or configuration settings associated with one or more other users who use the application.

2. The method of claim 1, wherein the suggested configuration settings include settings identified as productive configuration settings by the one or more other users who have the same role as the user for whom the user productivity recommendation is generated, the method further comprising transmitting the user productivity recommendation to the client.

3. The method of claim 1, wherein the user context data further comprises situational data associated with a user of the application.

4. The method of claim 3, wherein the situational data comprises at least one of job title, job responsibilities, or current projects.

5. The method of claim 1, further comprising generating user interface metadata associated with the user productivity recommendation.

6. The method of claim 1, wherein the user productivity recommendation is generated based on disparate configuration settings associated with a second client.

7. The method of claim 1, wherein the user productivity recommendation is accessible to the client through a cloud network.

8. The method of claim 1, wherein the user context data is stored on a server implemented in a cloud computing environment, the operations further comprising associating additional functionality with the application based on the user context data.

9. A non-transitory computer-readable medium storing instructions executable by data processing apparatus to perform operations comprising:
    receiving configuration settings for an application at a client;
    storing the configuration settings as user context data; and
    automatically generating a user productivity recommendation for improving productivity of the user based on the user context data, wherein the user productivity recommendation includes suggested configuration settings suggested for the user based at least in part on prior configuration settings associated with the user or configuration settings associated with one or more other users who use the application.

10. The medium of claim 9, wherein the suggested configuration settings include settings identified as productive configuration settings by the one or more other users who have the same role as the user for whom the user productivity recommendation is generated, the operations further comprising transmitting the user productivity recommendation to the client.

11. The medium of claim 9, wherein the user context data further comprises situational data associated with a user of the application.

12. The medium of claim 11, wherein the situational data comprises at least one of job title, job responsibilities, or current projects.

13. The medium of claim 9, the operations further comprising generating user interface metadata associated with the user productivity recommendation.

14. The medium of claim 9, wherein the user productivity recommendation is generated based on disparate configuration settings associated with a second client.

15. The medium of claim 9, wherein the user productivity recommendation is accessible to the client through a cloud network.

16. The medium of claim 9, wherein the user context data is stored on a server implemented in a cloud computing environment, the operations further comprising associating additional functionality with the application based on the user context data.

17. A system comprising:
  data processing apparatus; and
  a computer-readable medium storing instructions executable by the data processing apparatus to perform operations comprising:
    receiving configuration settings for an application at a client;
    storing the configuration settings as user context data; and
    generating a user productivity recommendation for improving productivity of the user based on the user context data, wherein the user productivity recommendation includes suggested configuration settings suggested for the user based at least in part on prior configuration settings associated with the user or configuration settings associated with one or more other users who use the application.

18. The system of claim 17, wherein the productivity recommendation is accessible to the client through a cloud network, wherein the suggested configuration settings include settings identified as productive configuration settings by the one or more other users who have the same role as the user for whom the user productivity recommendation is generated, the operations further comprising transmitting the user productivity recommendation to the client.

19. The system of claim 17, wherein the user context data further comprises situational data associated with a user of the application, wherein the situational data comprises at least one of job title, job responsibilities, or current projects, and wherein the user context data is stored on a server implemented in a cloud computing environment, the operations further comprising associating additional functionality with the application based on the user context data.

20. The system of claim 17, the operations further comprising generating user interface metadata associated with the user productivity recommendation.

* * * * *